Figures 1, 5:
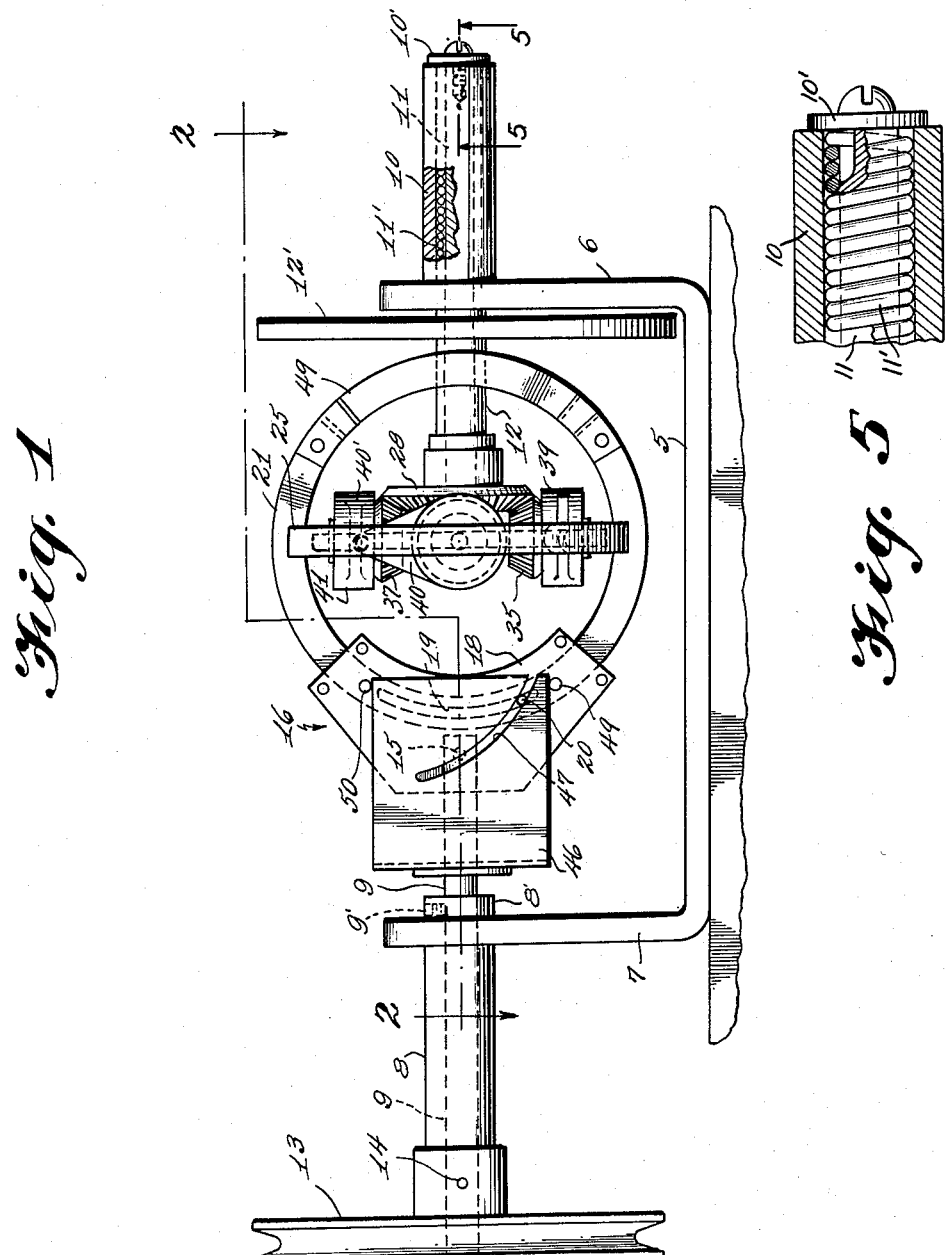

Nov. 8, 1960    I. L. LOOKER    2,959,062
MECHANICAL TRANSMISSIONS
Filed Nov. 26, 1957    2 Sheets-Sheet 1

INVENTOR
IVAN L. LOOKER

Nov. 8, 1960     I. L. LOOKER     2,959,062
MECHANICAL TRANSMISSIONS
Filed Nov. 26, 1957     2 Sheets-Sheet 2
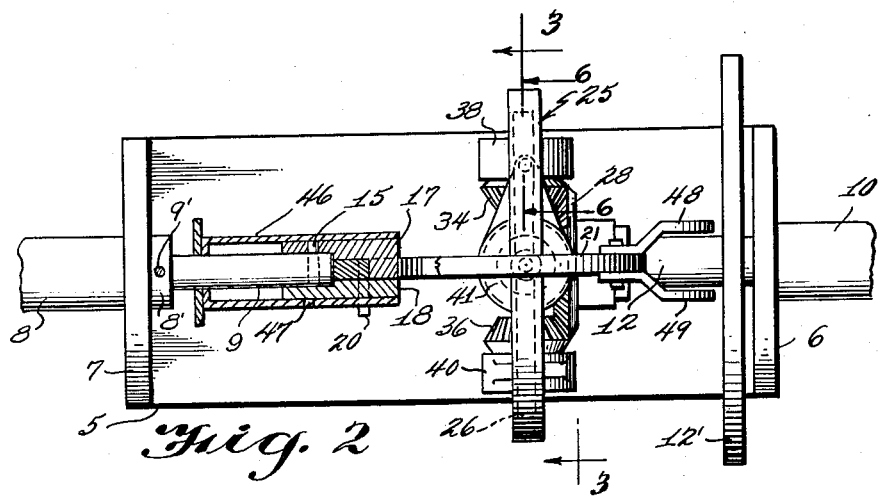
Fig. 2
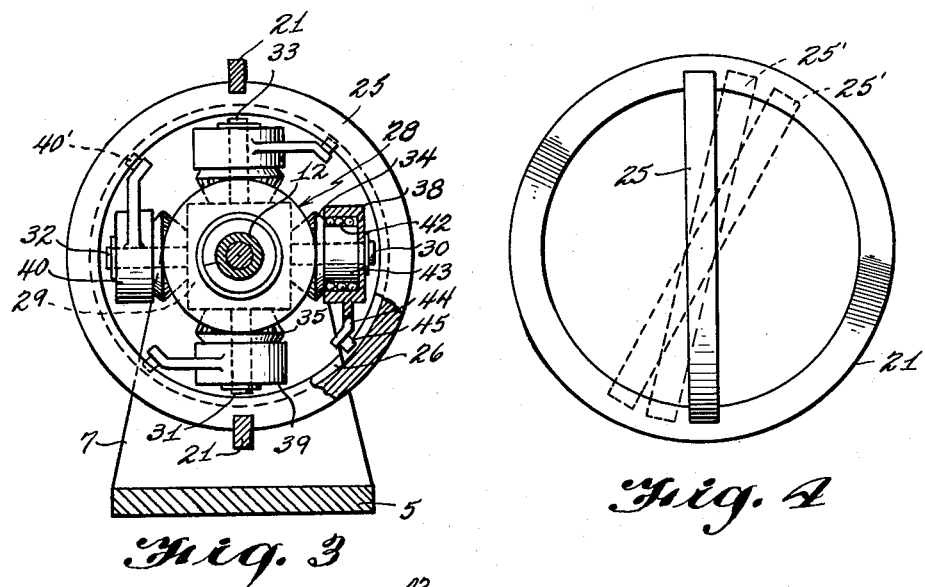
Fig. 3
Fig. 4
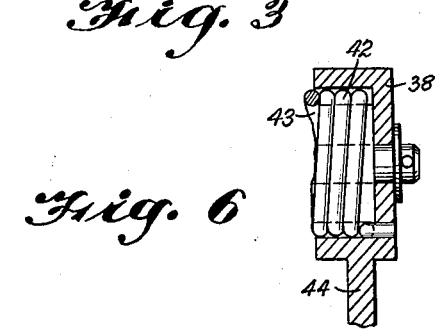
Fig. 6
INVENTOR
IVAN L. LOOKER
BY
ATTORNEY United States Patent Office 2,959,062
Patented Nov. 8, 1960

2,959,062
MECHANICAL TRANSMISSIONS
Ivan L. Looker, 560 E. Mulberry St., Watseka, Ill.
Filed Nov. 26, 1957, Ser. No. 698,979
2 Claims. (Cl. 74—117)

This invention relates to a mechanical power transmission for rotary motion.

Hydraulic torque converters have been used in many applications since they allow a smooth variation of the torque applied to a driven member and a smooth change of ratios. The present invention is a relatively simple mechanical structure having the desirable characteristics of gradual application of torque and smooth change of gear ratios. The present mechanical device has desired torque multiplication and variable speed characteristics without requiring the use of a fluid coupling of any kind.

The primary object of this invention is to provide a new and improved mechanical transmission of the character described.

Another object is to provide a mechanism for connecting input and output shafts in any desired gear ratio within a predetermined design limit allowing a wide range of variation.

Another object is to provide a mechanical transmission having an initial idling relation, and not needing a fluid coupling or an auxiliary clutch to change from idling to driving.

Another object is to provide a mechanical transmission having an operative drive between an input and output shaft including a plurality of gears constantly in mesh with but sequentially in drive relation to a central gear which drives the output shaft.

A further object is to provide a mechanical transmission in which an idling relation between an input and output shaft is achieved without disenmeshing driving gears.

Other objects, features and advantages of the present invention will be apparent from the following description of an exemplary model which illustrates an embodiment of the invention in a small transmission capable of transmitting small amounts of power, in which:

Figure 1 is a side elevational view, partially in cross section,

Figure 2 is a top plan view partially broken away and partially in section taken substantially along line 2—2 in Figure 1, Figure 3 is a transverse sectional view through the transmission at about line 3—3 in Figure 2, Figure 4 is a diagrammatic side elevational view of the tiltable control member illustrated in Figure 1, Fig. 5 is an enlarged cross-sectional view taken on line 5—5 of Fig. 1, and Fig. 6 is an enlarged cross-sectional view taken on line 6—6 of Fig. 2.

The transmission illustrated in the drawings is of small size and intended only for transmitting a small amount of power. Various modifications will be apparent to those skilled in the art in order to adapt the transmission to various particular power transmitting requirements. In general, the transmission has an output shaft carrying a central gear about which are arranged a plurality of drive gears. The drive gears are idly mounted upon their respective shafts and receive driving force through one-way clutches and crank arms which are oscillated, which force is imparted to the output gear, with which the drive gears are always in mesh. Each crank arm has an outer end following a cam ring or track. The relation between the plane of the cam and the axis of the drive gears may be relatively altered to vary the throw of the cranks. Only one drive gear imparts driving force to the output gear at one time. By altering the position of the cam to bring its plane into coincidence with a plane passing through the axes of the drive gears, no driving force will be imparted to the output shaft. As soon as there is an acute angle between the plane of the cam and the plane through the axes of the drive gears, driving from the input to the output shaft will occur.

An understanding of the elements of the transmission as well as their function will be apparent by reference to the accompanying drawings showing a model of a small transmission embodying the invention. In the model, a frame 5 is provided with a pair of upstanding legs 6 and 7 spaced apart for holding bearing 8 for the input shaft 9 and bearing 10 for the carrier shaft 11 upon which an output shaft 12 is rotatably mounted. A spring-type overrunning clutch 11' is provided between the bearing 10 and the carrier shaft 11 so that the carrier shaft 11 may rotate only in the same direction as the output shaft 12 may rotate. A flywheel 12' is mounted upon output shaft 12. A screw and washer 10' are affixed to the carrier shaft 11 for the purpose of controlling end play of carrier shaft 11. A pulley wheel 13 is secured as by pin 14 to the input shaft 9 in turn secured by the pin 15 to the ring holder 16. Collar 8' secured to input shaft 9 by set screw 9' controls end play of input shaft 9. The ringholder 16 is formed of a solid arcuately slotted block portion 17 and a covering plate 18 having an arcuate groove 19 therein for accommodating a pin 20 secured to the support ring 21 for the cam ring. The cam ring 25 constitutes a complete ring carried within the support ring 21 and securely fastened thereto. In the present embodiment, rings 21 and 25 rotate with the input shaft 9. As shown in Figure 1, the cam ring 25 will rotate in its own track; that is, the cam ring 25 is shown in a position perpendicular to the axis of the input shaft.

Rotary motion is imparted to the output shaft 12 journalled upon carrier shaft 11 which is in turn held in overrunning clutch 11' which is in turn held by bearing 10. The carrier shaft 11 passes through the hollow output shaft 12. The output shaft carries a gear 28 mounted on the inner end thereof. The block 29 at the inner end of carrier shaft 11 supports four (4) stub shafts, 30, 31, 32 and 33, extending radially of the carrier shaft 11. A drive gear is mounted on each stub shaft and each is so positioned thereon as to be in mesh with the output gear 28 at all times.

In Figure 3, all four drive gears, 34, 35, 36 and 37 are shown. Each drive gear, being idly mounted upon its stationary stub shaft, receives driving impetus from a crank connected with the drive gear by a one-way clutch. In Figure 3, each drive gear, as shown, is provided with a similar crank 38, 39, 40 and 41. It will be noted that the crank 38 is shown in section and a spring type, one-way clutch 42 is housed within the hollow hub of the crank for connecting the crank and the hub portion 43 of the drive gear 34. The crank 38 has an outwardly extending arm 44 with a follower 45 reposing within the groove 26 in the cam ring 25. Each of the cranks are as identical in structure as machining will permit. The invention is not intended to be limited to the use of any one type of one-way clutch, rather it is intended that any suitable type of one-way clutch may be employed, As previously mentioned, the cam ring 25 rotates with the input shaft. The support ring 21 which supports the cam ring 25 may be caused to rotate relative to the input shaft 9 in order to vary the relation of the cam ring to the input shaft axis from perpendicular through a range of acute angles. This may be accomplished by moving a U-shaped shifting member 46 which embraces the ring holder 16 and has an arcuate slot 47 in one side also embracing the pin 20. The shifting member is loosely mounted on the drive or input shaft 9, so that it may slide longitudinally of the shaft, causing the pin on the support ring 21 to follow both arcuate slots 19 and 47, thus turning the support ring relative to the input shaft. No means for sliding shifting member 46 back and forth at will so as to vary the tilt of cam ring 25 is shown in the drawings. Various mechanisms could be employed for this purpose. Such is not a part of the present invention. The support ring 21 merely slides in the arcuate slot provided in the block portion 17. The unit is maintained in balance by continuing the support ring 21 around the output shaft 12. Portions 48 and 49 at opposite sides of the output shaft 12 provide a connection for the ring about the shaft and permit shifting of the ring tilt without interference with the output shaft. As the cam ring 25 is moved from the full line position of Figure 4 toward one of the dotted line positions 25', each crank will be caused to reciprocate in following the groove 26 in the cam ring 25. As the crank arm moves in one direction, the oneway clutch will cause the drive gear to follow the crank motion imparting a driving force to the output shaft 12 through the output gear 28.

In the present transmission, four drive gears are equally spaced about the output gear 28. The drive gears cause the output gear to move and each drive gear would cause this movement during 90 degrees of movement of the input shaft. In practice, a larger or smaller number of drive gears may be employed.

It will be apparent from the above description that no driving force can be imparted to the output shaft when the cam ring is perpendicular to the axis of the input shaft; however, driving force will be imparted to the output when the cam ring 25 is tilted in any amount sufficient to take up slack, if any, in the one-way clutches. The ratio between the input and output shafts may be varied by varying the degree of tilt of the cam ring. A speed radiation or variation is thereby produced with this control.

As the input shaft rotates, if the cam ring is in a tilted position, the cranks are caused to oscillate. The size of the arc of such oscillation is controlled by the angle of tilt at which the cam ring is held during its rotation. The one-way clutches transmit this oscillating motion to the drive gears only in one direction, and all are constructed so as to transmit it in the same direction. At any instant of time, the crank arm which is being oscillated in the "drive" direction at a greater speed than any other crank arm, will engage its drive gear through its one-way clutch and thereby impart driving force to the output gear.

One-way clutch 11' between carrier shaft 11 and bearing 10 permits carrier shaft 11 to turn in the same direction as the output shaft 12, so that whenever the angle of tilt of cam ring 25 becomes such that carrier shaft 11 does not receive a force tending to rotate it in the opposite direction from that in which output shaft 12 rotates, carrier shaft 11 may then rotate in the same direction as that in which output shaft 12 rotates, thereby enabling the transmission to become a direct drive. When this occurs, the oscillation of the crank arms and the "working" of the one-way clutches will cease.

The present mechanical transmission is particularly useful in that it permits an idling position between the input and output shaft without disconnecting the driving gears. The first tilting of the control ring provides a very low gear ratio for initial movement of the output shaft. Once momentum has been established, the ring can be tilted further to change the gear ratio and the relative speed of the output shaft.

The foregoing detailed description has been given for clearness of undertsanding only and no unnecessary limitations should be understood therefrom, for modifications will be obvious to those skilled in the art.

I claim:

1. A mechanical power transmission for rotary motion, comprising: a circular cam member rotated by a power input shaft, a means during rotation, to selectively vary the angle between the axis of said power input shaft and the plane of the cam member; a plurality of followers slidably connected to said cam member; a plurality of one way clutches, each follower affixed to the input member of one of the one-way clutches; a plurality of drive gears, means for the output member of each one-way clutch to drive one of the drive gears; a central driven gear in mesh with the drive gears; an output shaft to which the central driven gear is drivingly connected; a support member for the drive gears and the one-way clutches, a means to allow said support member to rotate in the same direction and about the same axis as does the central driven gear; a means to prevent said support member from any other movement relative to the output shaft.

2. A mechanical power transmission for rotary motion, comprising: a circularly mounted plurality of one-way clutches, the output member of each of said clutches arranged to drive one of a plurality of gears, said gears arranged about one center gear and enmeshed with said center gear; a ring which power input causes to rotate concentrically about the circle described by the positions of the one-way clutches, the input member of said clutches having a follower slidably connected to said ring; a means for causing the plane of said ring to rotate within the range of a predetermined number of degrees about the center of rotation of said ring, so that the plane of said ring can be held perpendicular to the axis of rotation of said center gear or held at various angles to said axis of rotation of said center gear; a support for the drive gears and one-way clutches which will permit them to rotate in the direction of the power output shaft but not in the opposite direction.

References Cited in the file of this patent

UNITED STATES PATENTS

| | | |
|---|---|---|
| 1,193,728 | Staude | Aug. 8, 1916 |
| 1,280,901 | Tornberg | Oct. 8, 1918 |
| 2,079,197 | Bergman | May 4, 1937 |
| 2,581,498 | Rayburn | Jan. 8, 1952 |
| 2,672,062 | Marchi | Mar. 16, 1954 |